United States Patent
Zhao et al.

(10) Patent No.: US 8,602,375 B2
(45) Date of Patent: Dec. 10, 2013

(54) PORTABLE AND FOLDABLE SUPPORT BRACKET

(75) Inventors: Ben-Xiang Zhao, Shenzhen (CN); Wu-Zhu Hu, Shenzhen (CN); Wu-Qi Li, Shenzhen (CN); Tang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/303,371

(22) Filed: Nov. 23, 2011

(65) Prior Publication Data

US 2012/0325987 A1    Dec. 27, 2012

(30) Foreign Application Priority Data

Jun. 24, 2011    (CN) .......................... 2011 1 0173153

(51) Int. Cl.
    *A47B 97/04*    (2006.01)
(52) U.S. Cl.
    USPC .................. 248/371; 248/415; 248/163.1

(58) Field of Classification Search
    USPC ........... 248/370, 371, 393, 395, 163.1, 188.1, 248/188.6, 188.8, 166, 167, 415, 418, 248/276.1, 460, 462, 463, 464
    See application file for complete search history.

(56) References Cited

U.S. PATENT DOCUMENTS

| | | | |
|---|---|---|---|
| 2,464,031 A * | 3/1949 | Samuel | 248/167 |
| 7,980,737 B2 * | 7/2011 | Hu | 362/382 |
| 8,020,818 B2 * | 9/2011 | Chou et al. | 248/176.1 |
| 8,186,639 B2 * | 5/2012 | Wang | 248/371 |
| 2007/0096002 A1 * | 5/2007 | Knight | 248/460 |
| 2009/0140119 A1 * | 6/2009 | To et al. | 248/455 |

* cited by examiner

*Primary Examiner* — Steven Marsh
(74) *Attorney, Agent, or Firm* — Altis Law Group, Inc.

(57) ABSTRACT

A portable and foldable support bracket for supporting and holding a portable electronic device includes a first support member, a pivot mechanism, a second support member and a support arm. The second support member is rotatably and adjustably assembled with the first support member via the pivot mechanism, and is positioned coplanar with the first support member. The support arm is rotatably and adjustably assembled to the pivot mechanism and foldable upon the first and second support members.

16 Claims, 5 Drawing Sheets

PORTABLE AND FOLDABLE SUPPORT BRACKET

BACKGROUND

1. Technical Field

This disclosure relates to support brackets, and particularly, to a portable and foldable support bracket.

2. Description of Related Art

Portable electronic devices such as tablet computers, e-books, and mobile phones are widely used and are all equipped with big screens. When the consumers use the portable electronic device to watch programs outdoors, it always needs to be held in the hand at all times, thus it is inconvenient for people to do other things. Therefore, there needs to be a support bracket to hold the portable electronic device.

However, the existing support brackets are bulky and have a complex structure taking up a large space, and it is also inconvenient to carry which can be unsatisfactory for the consumers.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the present disclosure. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
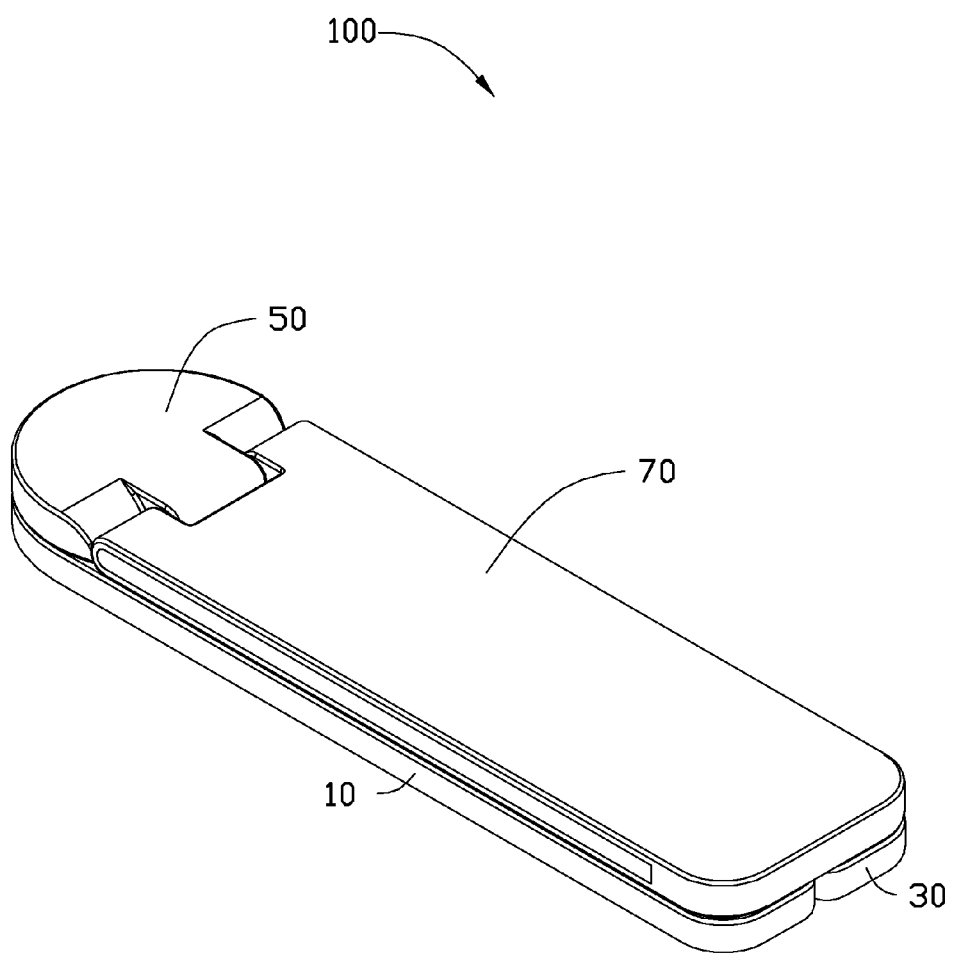
FIG. 1 is an isometric view of an embodiment of an assembled portable and foldable support bracket in a foldable state.
Figure 2:
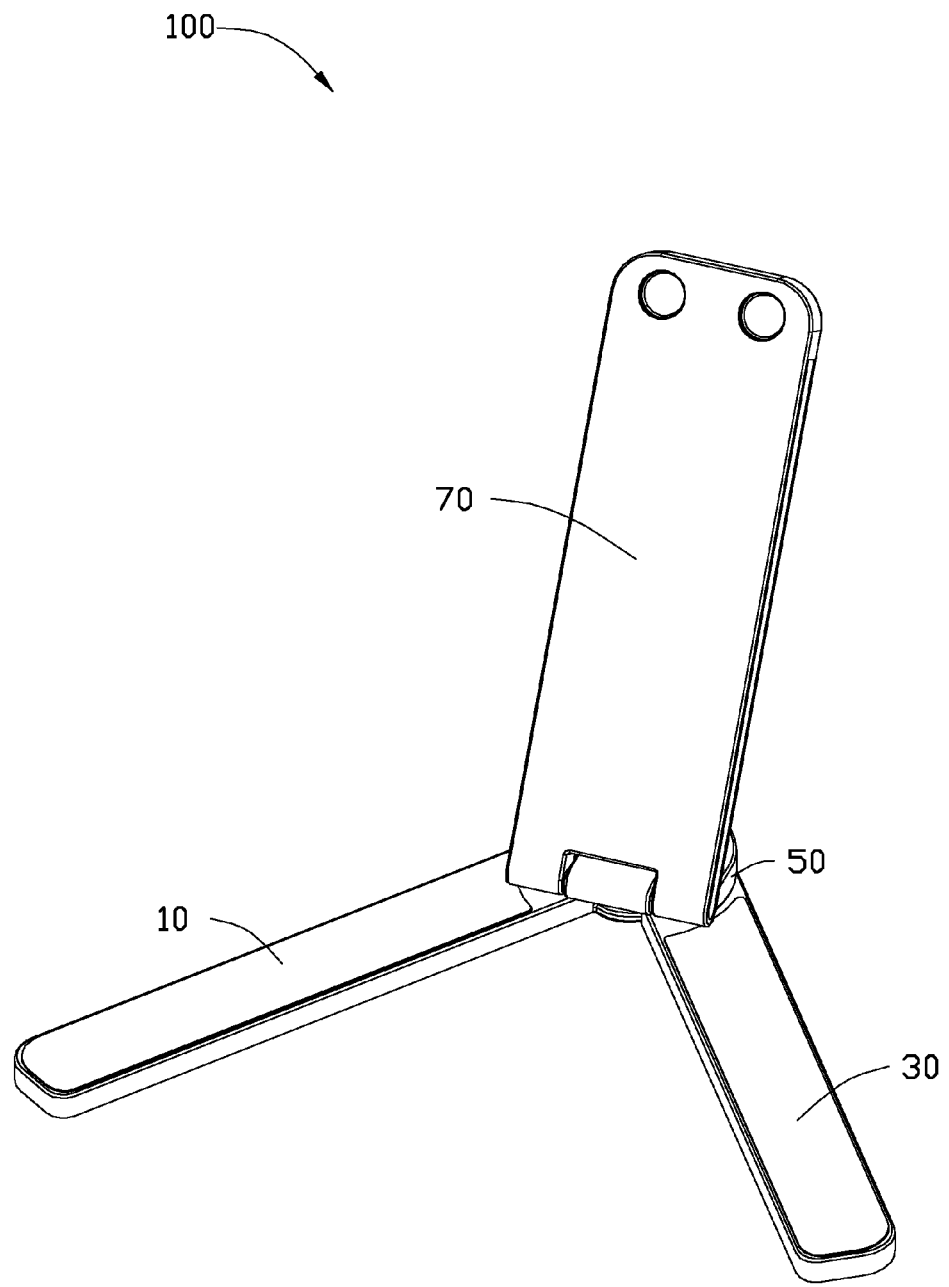
FIG. 2 is an isometric view of an embodiment of the portable and foldable support bracket in a using state.

Referring to FIGS. 1 and 2, an embodiment of a portable and foldable support bracket 100 is used for supporting and holding an electronic device (not shown) such as a digital photo frame, an e-book, a tablet computer or a mobile phone, for example. The portable and foldable support bracket 100 includes a first support member 10, a second support member 30, a pivot mechanism 50 and a support arm 70. The first support member 10 and the second support member 30 are rotatably and adjustably assembled together via the pivot mechanism, and are coplanar with each other. The support arm 70 is rotatably and adjustably assembled with the pivot mechanism and is foldably mounted upon the first and second support members 10, 30.

Figure 3:
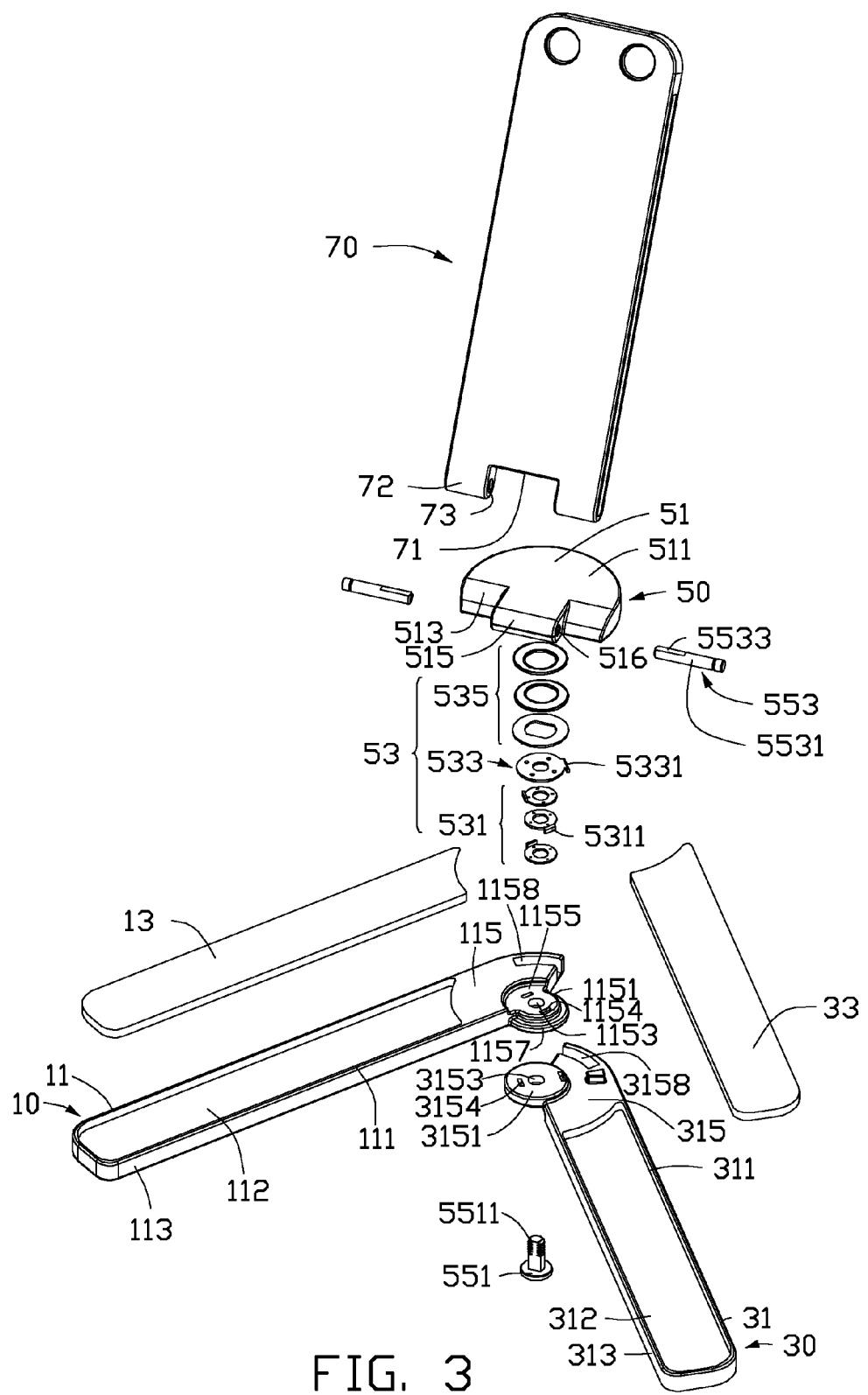
FIG. 3 is an exploded, isometric view of the portable and foldable support bracket of FIG. 2.
Figure 4:
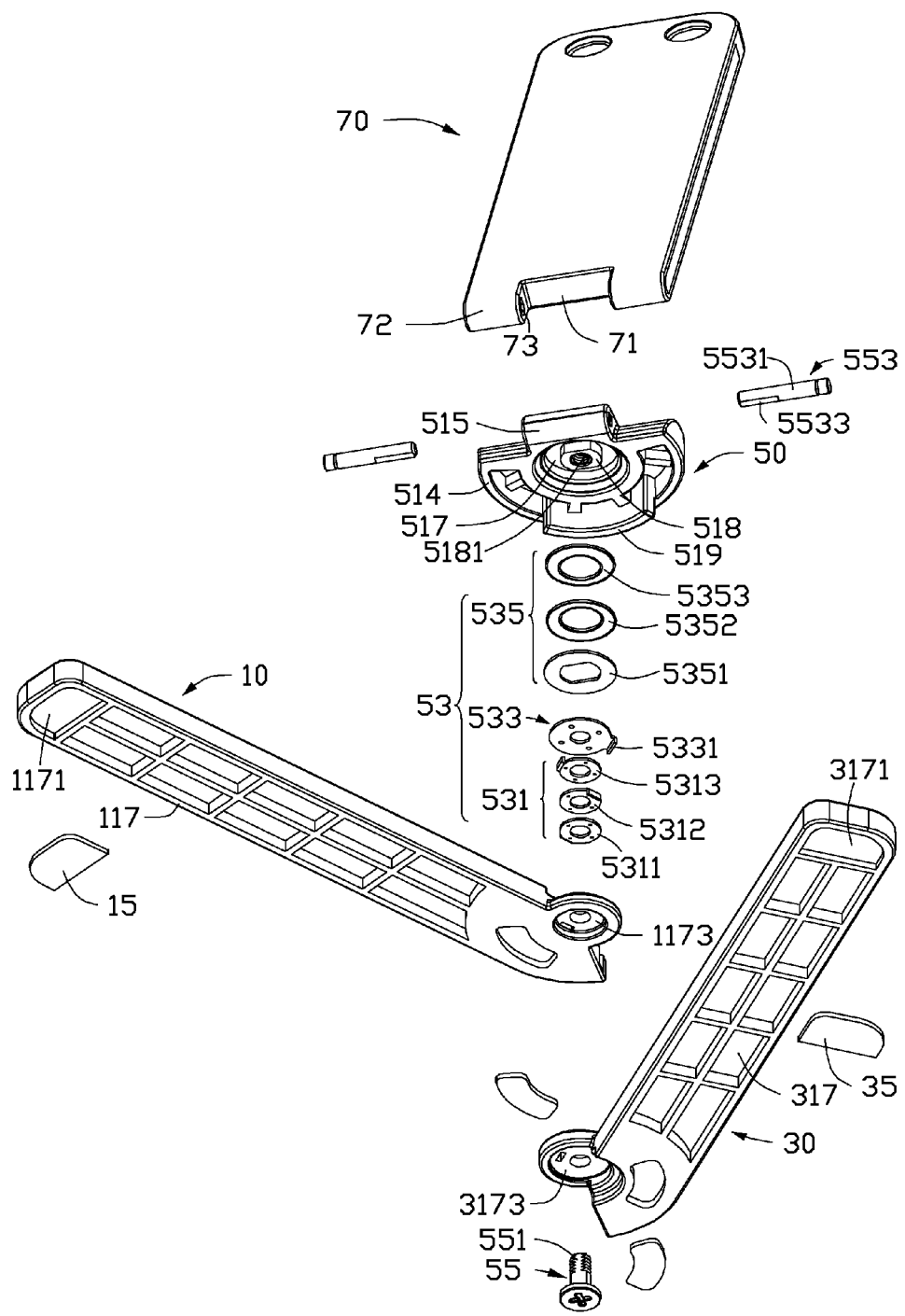
FIG. 4 is similar to FIG. 3, but viewed from another aspect.

Also referring to FIGS. 3 and 4, the first support member 10 includes a main body 11, a antiskid plate 13 detachably mounted on the main body 11, and two support pads 15. The main body 11 is a substantially bar-shaped board, and includes a support top surface 111, a support end 113, a hinged end 115 opposite to the support end 113, and a bottom surface 117 opposite to the support top surface 111. A receiving slot 112 is recessed from the support top surface 111, and positioned adjacent to the support end 113. In the illustrated, the receiving slot 112 is substantially rectangular bar-shaped, recessed from the support top surface 111 toward the opposite hinged end 115. The antiskid plate 13 is an elongated plate and is detachably assembled into the receiving slot 112 and partially exposed from the receiving slot 112 toward the support top surface 111, for supporting and holding a portable electronic device (not shown). The antiskid plate 13 is made of non-slip or antiskid material, such as silica gel. The antiskid plate 13 may also be integrally formed with the main body 11, or is directly fixed to the support top surface 111.

The hinged end 115 is substantially arc-shaped, and includes a substantially fan-shaped hinged portion 1151 extending out from the cross section of the hinged end 115, and is coaxially and coplanar with the arc-shaped hinged end 115. A hinged hole 1153 is defined through the central portion of the hinged portion 1151. Two non-circular latching holes 1154 are defined through the hinged portion 1151 and oppositely positioned at two sides of the hinged hole 1153. An arc-shaped recession 1155 is recessed from the joint of the hinged end 115 and the hinged portion 1151. A stepped arc-shaped engaging portion 1157 is formed at the peripheral of the hinged portion 1151 thereby surrounding the hinged hole 1153. An arc-shaped guiding slot 1158 is recessed from the support top surface 111 and is positioned away from the hinged hole 1153. A receiving hole 1173 is defined in the bottom surface of the hinged portion 1151 to coaxially communicate with the hinged hole 1153.

The bottom surface 117 defines two mounting slots 1171 positioned adjacent to two ends thereof. The two support pads 15 are mounted within the two mounting slots 1171, respectively, and partially exposed from the bottom surface 117.

The second support member 30 has a similar shape and structure as that of the first support member 10. The second support member 30 includes a main body 31, an antiskid plate 33 detachably mounted on the main body 31, and two support pads 35. The main body 31 includes a support top surface 311, a support end 313, a hinged end 315 opposite to the support end 313, and a bottom surface 317 opposite to the support top surface 311. The top surface 311 defines a receiving slot 312 adjacent to the support end 313 for assembling and receiving the antiskid plate 33. A fan-shaped hinged portion 3151 is formed on the hinged end 315. The hinged portion 3151 defines a hinged hole 3153 and two latching holes 3154 positioned at two sides of the hinged hole 3153. An arc-shaped guiding slot 3158 is recessed from the support top surface 311 and positioned adjacent to hinged portion 3151. The bottom surface 317 defines two mounting slots 3171 positioned adjacent to two ends thereof. A receiving hole 3173 is defined in the bottom surface of the hinged portion 3151 to coaxially communicate with the hinged hole 1153. The antiskid plate 33 is detachably mounted within the receiving slot 312 and is also made of non-slip material. The two support pads 35 are mounted within the two mounting slots 3171, respectively, and partially exposed from the bottom surface 317.

The pivot mechanism 50 includes a base body 51, a friction assembly 53 and a fixing assembly 55. The base body 51 is substantially semicircular board shaped, and includes a top surface 511, a slanted mounting end surface 513 and a bottom surface 514 opposite to the top surface 511. A hinged block 515 is formed on a substantially middle portion of the mounting end surface 513. A pivot hole 516 is defined through the hinged block 515 along a direction parallel to the diametrical direction of the base body 51. A substantially circular mounting recession 517 is recessed from the bottom surface 514 for receiving and engaging with the corresponding hinged portion 1151. A pivotal post 518 is formed within the mounting recession 517. The pivotal post 518 defines a fixing threaded hole 5181 coaxial with the pivotal post 518. An arc-shaped guiding rib 519 is formed on the bottom surface 514 and positioned coaxially with the pivotal post 518, corresponding to the guiding slot 1158 and the guiding slot 3158.

The friction assembly 53 includes three friction disks 531, a flat washer 533 and three elastic washers 535. The three friction disks 531 are consist of a first friction disk 5311, a second friction disk 5312 and a third friction disk 5313. Each friction disk 531 is substantially ring-shaped, and includes a latching rib (not labeled) extending from a periphery of the friction disk 531 and bending toward one side. The first friction disk 5311, the second friction disk 5312 and the third friction disk 5313 are assembled within the receiving hole 1173, the recession 1155 and the receiving hole 3173, respectively (see FIG. 5). The flat washer 533 has a shape substantially the same as the friction disk 531, and is mounted on the hinged portion 3151. The flat washer 533 includes a latching rib 5331 extending and bending from the periphery of the flat washer 533, corresponding to the latching hole 3154. The three elastic washers 535 consist of a first elastic washer 5351, a second elastic washer 5352 and a third elastic washer 5353, and are assembled within the mounting recession 517, and sleeved on post 518 in that order.

The fixing assembly 55 includes a fixing member 551 and two pivotal shafts 553. In the illustrated embodiment, the fixing member 551 is a screw having a threaded portion 5511 formed at a distal end, corresponding to the fixing threaded hole 5181. The two pivotal shafts 553 are oppositely mounted to two ends of the hinged block 515 for hinging the support arm 70 with the base body 51. Each pivotal shaft 553 is substantially cylindrical, and includes a circular pivot end 5531 and an opposite non-circular fixing end 5533.

The support arm 70 is a substantially bar-shaped board, and is hinged to the base body 51 via the two pivotal shafts 553. One end of the support arm 70 defines a hinged slot 71 corresponding to the hinged block 515, and thereby forming two opposite hinged arms 72 positioned at two sides of the hinged slot 71. Each hinged arm 72 defines pivotal hole 73 corresponding to the pivot end 5531.

Figure 5:
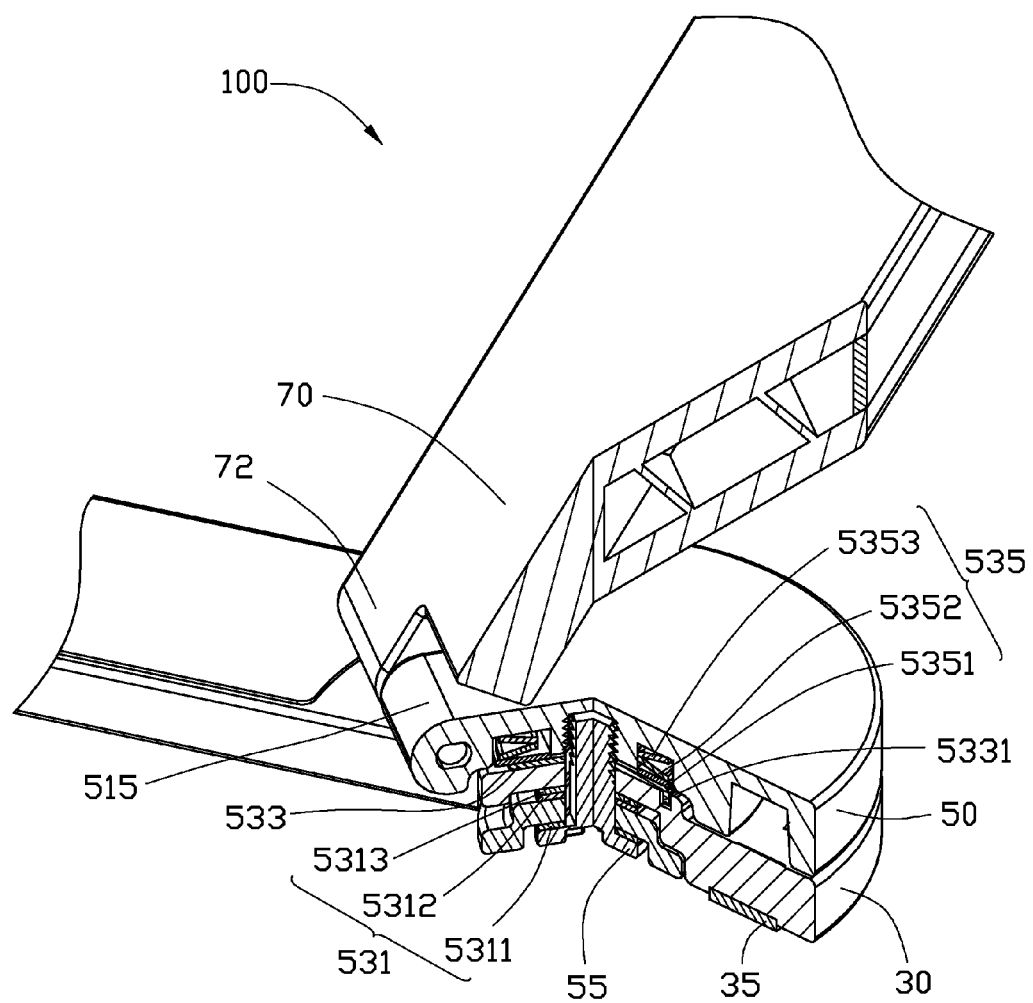
FIG. 5 shows a partial, cutaway view of the assembled portable and foldable support bracket of FIG. 2.

Also referring to FIG. 5, when assembling the portable and foldable support bracket 100, the first friction 5311, the second friction disk 5312 and the third friction disk 5313 are firstly assembled within the receiving hole 1173, the recession 1155 of the first support member 10 and the receiving hole 3173 of the second support member 30, respectively. The two hinged ends 115, 315 are assembled together, with the guiding slot 1158 and the guiding slot 3158 aligning with each other and cooperatively forming an arc-shaped engaging slot, corresponding to the guiding rib 519. The hinged portion 3151 is coaxially mounted on the hinged portion 1151 and received within the recession 1155. The flat washer 533 is then mounted on the hinged portion 3151, with the latching rib 5331 latching into the corresponding latching hole 3154. The first elastic washer 5351, the second elastic washer 5352 and the third elastic washer 5353 are assembled within the mounting recession 517, and sleeved on the pivotal post 518 in that order. The base body 51 is mounted on the joint of the two hinged ends 115, with the fixing threaded hole 5181 aligning and being coaxially with the hinged hole 1153 and the hinged hole 3153. The threaded portion 5511 passes through the hinged hole 3153, the hinged hole 1153 and finally threaded into the corresponding fixing threaded hole 5181, such that, the first and second support members 10, 30 are rotatably and adjustably assembled together. Finally, the support arm 70 is hinged to the hinged block 515 via the two pivot shafts 553 to finish the assembly of the portable and foldable support bracket 100.

Referring to FIGS. 1 and 2, as in use, the support arm 70 of the portable and foldable support bracket 100 can be adjusted and rotated relative to the first and second support members 10, 30 to form an obtuse viewing angle with the first and second support members 10, 30. The first and second support member 10, 30 can also be rotated relative to each other to form a substantially V-shaped support base (not labeled, as shown in FIG. 2). Such that, the electronic device (not shown) such as a digital photo frame, an e-book, a panel computer or a mobile phone, for example, can be placed on the support base defined by the first and second support members 10, 30, and then slantingly abut against the support arm 70, providing a perfect viewing angle to the users. When the portable and foldable support bracket 100 is in an unused state, the first and second support members 10, 30 can be folded together, and the support arm 70 can also be folded and placed upon the first and second member 10, 30 to form a substantially rectangular shaped object. Thus, the folded support bracket 100 has a simple structure with small volume, and is easy to carry or take out thereby giving great convenience to the user.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable and foldable support bracket for supporting and holding a portable electronic device, comprising:
    a first support member;
    a pivot mechanism;
    a second support member rotatably and adjustably assembled with the first support member via the pivot mechanism, and the second support member being coplanar with the first support member; and
    a support arm rotatably and adjustably assembled to the pivot mechanism and foldable upon the first and second support members, wherein each of the first support member and the second support member comprises a main body and an antiskid plate, the main body comprises a support top surface, a support end, a hinged end opposite to the support end, and a bottom surface; the antiskid plate is detachably mounted on the support top surface of the main body; the two hinged ends of the first and second support members are hinged together via the pivot mechanism.

2. The portable and foldable support bracket of claim 1, wherein each hinged end is substantially arc-shaped, and comprises a substantially fan-shaped hinged portion extending out therefrom, and being coaxially and coplanar with the arc-shaped hinged end; the hinged portion defines a hinged hole through the central portion thereof; the pivot mechanism comprises a base body and a fixing member, the fixing member passes through the two hinged holes of the first and second support members and is fixed to the base body.

3. The portable and foldable support bracket of claim 2, wherein each of the first support member and the second support member comprises an arc-shaped guiding slot recessed from the support top surface of the hinged end and communicating with the cross sectional end surface thereof, the two guiding slots are aligned with each other and cooperatively define an arc-shaped engaging slot; the base body comprises an arc-shaped guiding rib formed on a bottom surface thereof and movably engaging into the corresponding engaging slot formed by the two guiding slots of the first and second support members.

4. The portable and foldable support bracket of claim 3, wherein the first support member comprises an arc-shaped recession recessed from a joint of the hinged end and the hinged portion, the hinged portion of the second support member is coaxially mounted on the hinged portion of the first support member and received within the recession of the hinged portion of the first support member.

5. The portable and foldable support bracket of claim 3, wherein the hinged portion of the first support member further defines two latching holes oppositely positioned at two sides of the hinged hole; the portable and foldable support bracket further comprises two friction disks coaxially and opposite assembled at two sides of the hinged portion of the first support member, each friction disk comprises a latching rib extending from a periphery thereof and latching into one corresponding latching hole of the first support member.

6. The portable and foldable support bracket of claim 4, wherein the base body comprises a mounting recession recessed from the bottom surface of the base body and a pivotal post formed within the mounting recession and defining a fixing threaded hole coaxially with the pivotal post; the hinged portion of the first support member is assembled into the mounting recession of the base body, the fixing member passes through the hinged holes of the first and second support members and finally threaded into the corresponding fixing threaded hole of the pivotal post of the base body.

7. The portable and foldable support bracket of claim 6, further comprising an elastic washer sleeved on the pivotal post and received within the mounting recession of the base body and elastically resisting against the hinged portion of the first support member.

8. The portable and foldable support bracket of claim 2, wherein the base body is substantially semicircular board shaped, and comprises a slanted mounting end surface and a hinged block formed on the mounting end surface of the base body; the support arm defines a hinged slot through one end thereof corresponding to the hinged block of the base body; the hinged block engages into the hinged slot of the support arm, the support arm is rotatably hinged to the hinged block of the base body via a pivot shaft.

9. A portable and foldable support bracket for supporting and holding a portable electronic device, comprising:
  a first support member having an arc-shaped hinged end;
  a second support member having an arc-shaped hinged end and being coplanar with the first support member;
  a pivot mechanism mounted on the two arc-shaped hinged ends of the first and second support members, and rotatably and adjustably hinging the arc-shaped hinged end of the first support member with the arc-shaped hinged end of the second support member; and
  a support arm rotatably and adjustably assembled to the pivot mechanism and foldable upon the first and second support members, wherein each of the first support member and the second support member comprises a main body and an antiskid plate integrally formed on a support top surface of the main body and positioned away from the hinged end; the antiskid plate is made of non-slip or antiskid material.

10. The portable and foldable support bracket of claim 9, wherein each hinged end comprises a hinged portion extending out therefrom, and being coplanar with the arc-shaped hinged end; the hinged portion defines a hinged hole; the pivot mechanism comprises a base body and a fixing member, the fixing member passes through the two hinged holes of the first and second support member and is fixed to the base body.

11. The portable and foldable support bracket of claim 10, wherein the first support member and the second support member both comprise an arc-shaped guiding slot recessed from the support top surface of the hinged end, the two guiding slots align with each other and cooperatively define an arc-shaped engaging slot; the base body comprises an arc-shaped guiding rib formed on a bottom surface thereof and movably engaging into the corresponding engaging slot formed by the two guiding slots of the first and second support members.

12. The portable and foldable support bracket of claim 11, wherein the first support member comprises a recession recessed from a joint of the hinged end and the hinged portion, the hinged portion of the second support member is coaxially mounted on the hinged portion of the first support member and received within the recession of the hinged portion of the first support member.

13. The portable and foldable support bracket of claim 11, wherein the hinged portion of the first support member further defines two latching holes oppositely positioned at two sides of the hinged hole; the portable and foldable support bracket further comprises two friction disks coaxially and oppositely assembled at two sides of the hinged portion of the first support member, each friction disk comprises a latching rib extending from a periphery thereof and latching into one corresponding latching hole of the first support member.

14. The portable and foldable support bracket of claim 12, wherein the base body comprises a mounting recession recessed from the bottom surface of the base body and a pivotal post formed within the mounting recession and defining a fixing threaded hole coaxially with the pivotal post; the hinged portion of the first support member is assembled into the mounting recession of the base body, the fixing member passes through the hinged holes of the first and second support members and finally threaded into the corresponding fixing threaded hole of the pivotal post of the base body.

15. The portable and foldable support bracket of claim 14, wherein the base body is substantially semicircular board shaped, and comprises a slanted mounting end surface and a hinged block formed on the mounting end surface of the base body; the support arm defines a hinged slot through one end thereof corresponding to the hinged block of the base body; the hinged block engages into the hinged slot of the support arm, the support arm is rotatably hinged to the hinged block of the base body via a pivot shaft.

16. A portable and foldable support bracket for supporting and holding a portable electronic device, comprising:
  a first support member having an arc-shaped hinged end;
  a second support member having an arc-shaped hinged end and being coplanar with the first support member;
  a pivot mechanism mounted on the two arc-shaped hinged ends of the first and second support members, and rotatably and adjustably hinging the arc-shaped hinged end of the first support member with the arc-shaped hinged end of the second support member; and
  a support arm rotatably and adjustably assembled to the pivot mechanism and foldable upon the first and second support members, wherein each of the first support member and the second support member comprises a main body and an antiskid plate, the main body comprises a support top surface and a support end opposite to the hinged end; the support top surface defines a receiving slot positioned adjacent to the support end, the antiskid plate is detachably assembled into the receiving slot and partially exposed from the receiving slot toward the support top surface of the main body, for supporting and holding the portable electronic device placed on the support top surface of the main body.

* * * * *